(12) United States Patent
Liu

(10) Patent No.: US 11,661,029 B2
(45) Date of Patent: May 30, 2023

(54) AUTHENTICATION BETWEEN BATTERY MANAGEMENT SYSTEM (BMS) AND BATTERY HOST PLATFORM

(71) Applicant: TWS Technology (Guangzhou) Limited, Guangzhou (CN)

(72) Inventor: Charles Liu, Belmont, CA (US)

(73) Assignee: TWS Technology(Guangzhou) Limited, Guangzhou (CN)

( * ) Notice: Subject to any disclaimer, the term of this patent is extended or adjusted under 35 U.S.C. 154(b) by 174 days.

(21) Appl. No.: 17/337,840

(22) Filed: Jun. 3, 2021

(65) Prior Publication Data
US 2021/0402954 A1    Dec. 30, 2021

Related U.S. Application Data

(60) Provisional application No. 63/043,377, filed on Jun. 24, 2020.

(51) Int. Cl.
| | |
|---|---|
| *B60R 25/04* | (2013.01) |
| *B60R 25/045* | (2013.01) |
| *G07C 5/00* | (2006.01) |
| *B60L 53/66* | (2019.01) |
| *G06F 21/44* | (2013.01) |
| *B60L 50/64* | (2019.01) |
| *H04W 4/80* | (2018.01) |
| *B60L 53/65* | (2019.01) |

(52) U.S. Cl.
CPC ............ *B60R 25/045* (2013.01); *B60L 50/64* (2019.02); *B60L 53/65* (2019.02); *B60L 53/66* (2019.02); *G06F 21/44* (2013.01); *G07C 5/008* (2013.01); *H04W 4/80* (2018.02)

(58) Field of Classification Search
CPC ........ B60R 25/045; B60L 50/64; B60L 53/65; B60L 53/66; B60L 3/12; B60L 53/80; G06F 21/44; G07C 5/008; H04W 4/80; H04W 4/40; H04W 12/06; Y02T 10/70; Y02T 90/12; Y02T 90/167; Y02T 10/7072; Y02T 90/16; Y04S 30/14
USPC ......................................................... 340/5.8
See application file for complete search history.

(56) References Cited

U.S. PATENT DOCUMENTS

| | | | |
|---|---|---|---|
| 2003/0001541 A1* | 1/2003 | Ueda ...................... | B60L 58/10 320/134 |
| 2009/0287578 A1* | 11/2009 | Paluszek .............. | G06Q 20/204 705/17 |

(Continued)

*Primary Examiner* — Omar Casillashernandez
(74) *Attorney, Agent, or Firm* — Murphy, Bilak & Homiller, PLLC

(57) ABSTRACT

Embodiments include methods for a battery management system (BMS) for a battery pack configured to operate with a host platform (e.g., vehicle, charging station, diagnostic station, etc.). Such methods include authenticating the host platform based on communication between a first short-range wireless transceiver (SRWT) in the BMS and a compatible second SRWT in the host platform. Such methods include, based on the result of the authentication, regulating the following between the host platform and the battery pack: flow of energy, and communication of control and status information via the first SRWT. Other embodiments include BMS having a first SWRT and a controller configured to perform operations corresponding to the exemplary methods.

26 Claims, 7 Drawing Sheets

(56) References Cited

U.S. PATENT DOCUMENTS

| | | | |
|---|---|---|---|
| 2009/0313034 A1* | 12/2009 | Ferro | B60L 53/68 |
| | | | 705/1.1 |
| 2010/0094496 A1* | 4/2010 | Hershkovitz | B60L 50/66 |
| | | | 701/22 |
| 2011/0010043 A1* | 1/2011 | Lafky | B60L 53/63 |
| | | | 320/109 |
| 2014/0347018 A1* | 11/2014 | Boblett | B60L 58/13 |
| | | | 320/137 |
| 2017/0305288 A1* | 10/2017 | Lu | B60L 53/62 |
| 2019/0280343 A1* | 9/2019 | Wang | H01M 10/425 |
| 2019/0280344 A1* | 9/2019 | Wang | G06K 7/10821 |
| 2019/0283621 A1* | 9/2019 | Lin | H04B 5/0031 |

* cited by examiner

AUTHENTICATION BETWEEN BATTERY MANAGEMENT SYSTEM (BMS) AND BATTERY HOST PLATFORM

RELATED APPLICATIONS

The present invention claims priority to U.S. Prov. Appl. 63/043,377 filed Jun. 24, 2020, the entirety of which is incorporated herein by reference for all purposes.

TECHNICAL FIELD

The present invention generally relates to battery management systems (BMS) for batteries used to power electric vehicles (EVs), and particularly relates to using authentication via a short-range wireless connection to manage communication between BMS and host platform (e.g., vehicle) and energy flow between battery and host platform.

BACKGROUND

An electric vehicle (EV) uses one or more electric motors to drive the EV's wheels for propulsion. In most cases, EVs are powered by on-board battery packs, with the size of the battery pack being related to the size, weight, and performance requirements of the EV itself. In some instances, the EV may also include an internal combustion engine that runs on fossil fuel(s); these are often referred to as hybrid EVs. Many different types of EVs are currently being produced or planned for production, including cars, trucks, buses, motorcycles, scooters, bicycles, forklifts, and trains. In addition to these EVs that operate on hard surfaces (e.g., roads), other current or planned EVs include aircraft, surface ships (e.g., boats, personal watercraft), underwater vessels, and spacecraft.

The battery packs used in most EVs contain a large collection of rechargeable cells and are controlled by battery management systems (BMS). A battery pack with built-in BMS may also be referred to as a "smart battery pack" or "intelligent battery pack." Among other tasks, a BMS protects the battery pack from operating outside its safe operating area, monitors its state, calculates and reports battery status information, and receives control information from a host platform (e.g., vehicle). Communications with a host vehicle can be facilitated by an external communication interface, which can also be used to communicate with other host platforms such as battery chargers and diagnostic stations. The communication interface may be included in the same or a different wiring harness or connector as the wires that carry energy between the battery and the host platform.

Recently, shared transportation has grown rapidly due to a renewed interest in urbanism and growing environmental, energy, and economic concerns have intensified the need for sustainable alternatives. This has been facilitated by advances in electronic and wireless technologies, which have made sharing vehicles easier and more efficient. These services can be divided into two main types: ride sharing (or shared ride), where users are matched to empty seats in a vehicle; and vehicle sharing (or shared vehicle), where a single vehicle is available for use by any subscriber to the service.

EVs are increasingly being used in shared-vehicle services, including scooter-sharing services such as Lime, Bird, etc. These services often include a large number of identical EVs with battery packs that are removable to facilitate charging, maintenance, and replacement. However, there are some challenges when EVs with removable battery packs are used in shared-vehicle services. Solutions to these issues are needed to facilitate wider adoption of EVs in shared-vehicle services.

SUMMARY

Embodiments of the present disclosure provide specific improvements to battery management systems (BMS) for batteries used to power EVs, such as by providing, enabling, and/or facilitating solutions to overcome exemplary problems summarized above and described in more detail below.

Some embodiments include methods (e.g., procedures) for a BMS configured to control a battery pack for use with a host platform. These exemplary methods can include authenticating the host platform based on communication between a first short-range wireless transceiver (SRWT) in the BMS and a compatible second SRWT in the host platform. These exemplary methods can also include, based on the result of the authentication, regulating the following between the host platform and the battery pack: flow of energy, and communication of control and status information via the first SRWT.

In some embodiments, the BMS can also include a credential storage medium, or be associated with a credential storage medium in the battery pack. In such embodiments, the authenticating operations can include receiving, from the host platform via the first SRWT, first information identifying the host platform; retrieving the following from the credential storage medium: second information associated with the battery pack, and third information identifying the host platform; and determining an authentication level for the host platform based on the first information, the second information, and the third information.

In some embodiments, the BMS can determine an authentication level for the host platform according to the following sub-operations:

(A) Determining that the host platform is not authenticated if the first information does not correspond to the third information.

(B) When the first information corresponds to the third information, determining an association between the host platform and the battery pack, based on the first information and the second information. For example, the determined association can be one of the following:
- specific model of host platform to group of one or more specific battery pack;
- specific version of host platform to group of one or more specific battery pack;
- specific model of host platform to specific model of battery pack;
- specific version of host platform (e.g., hardware, software, or combination) to specific model of battery pack;
- specific version of host platform (e.g., hardware, software, or combination) to specific version of battery pack (e.g., hardware, software, or combination); and
- type of host platform to any battery pack.

(C) Determining whether the host platform is fully authenticated or partially authenticated based on the association.

In some embodiments, these exemplary methods can also include retrieving, from the credential storage medium, first information identifying the battery pack (e.g., credentials); and sending the first information identifying the battery pack to the host platform via the first SRWT. In this manner, the BMS can facilitate mutual authentication between the battery pack and the host platform.

In some embodiments, the regulating operations can include, when the host platform is not authenticated, disabling the flow of energy and the communication of control and status information; and otherwise (i.e., when host platform is fully or partially authenticated) enabling the flow of energy and the communication of control and status information according to a determined authentication level.

In some embodiments, the first SRWT comprises a first transceiver that utilizes a first short-range wireless protocol, by which the host platform authentication is performed (e.g., the communication on which the authentication is based), and a second transceiver that utilizes a second short-range wireless protocol, by which communication of control and status information is performed. In such embodiments, the BMS can enable the communication of control and status information by turning on the second transceiver and disable the communication of control and status information by turning off the second transceiver. In some embodiments, the first transceiver can be a Near-Field Communications (NFC) transceiver and the second transceiver can be a Bluetooth transceiver.

In other embodiments, the first SRWT includes only the first transceiver that is configured to communicate with the host platform (e.g., via a compatible SRWT on the host platform) via first and second links. Likewise, enabling the communication of control and status information comprises establishing the second link.

In some embodiments, the host platform can be a vehicle that is electrically coupled to the battery pack. In such embodiments, enabling the flow of energy and the communication of control and status information according to a determined authentication level can include enabling the flow of energy and the communication of all available control and status information when the host platform is at least partially authenticated. In some of these embodiments, the vehicle can be one of the following: a car, a truck, a bus, a scooter, a bicycle, a motorcycle, a boat, a personal watercraft, or a forklift.

In other embodiments, the host platform can be a charging station or a diagnostic station that is electrically coupled to the battery pack. In such embodiments, enabling the flow of energy and the communication of control and status information according to a determined authentication level can include enabling the flow of energy and the communication of all available control and status information between the host platform and the battery pack when the host platform is fully authenticated, and enabling the flow of energy and the communication of a subset of available control and status information between the host platform and the battery pack when the host platform is partially authenticated.

In some of these embodiments, partially authenticated can include the following levels: a first level in which communication is enabled for all available status information and communication of control information is disabled, and a second level in which communication is enabled for only a subset of available status information and communication of control information is disabled.

Other embodiments include BMS configured to perform operations corresponding to any of the exemplary methods described herein, as well as battery packs comprising such BMS. Other embodiments include non-transitory, computer-readable media storing program instructions that, when executed by processing circuitry, configure such BMS (or battery packs) perform operations corresponding to any of the exemplary methods described herein.

These and other embodiments described herein can facilitate authorized charging, diagnostics, maintenance, etc. of a battery pack while avoiding wear and tear on the battery pack and reducing and/or eliminating a need for expensive waterproofing of the battery pack. Furthermore, embodiments can reduce the risk of theft of removable battery packs because stolen battery packs would not be authenticated by another host platform. By addressing these issues, embodiments can facilitate wider adoption of EVs in shared-vehicle services.

These and other objects, features, and advantages of embodiments disclosed herein will become apparent upon reading the following Detailed Description in view of the Drawings briefly described below.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided as examples to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objects, features, and advantages of the enclosed embodiments will be apparent from the following description.

Figure 1:
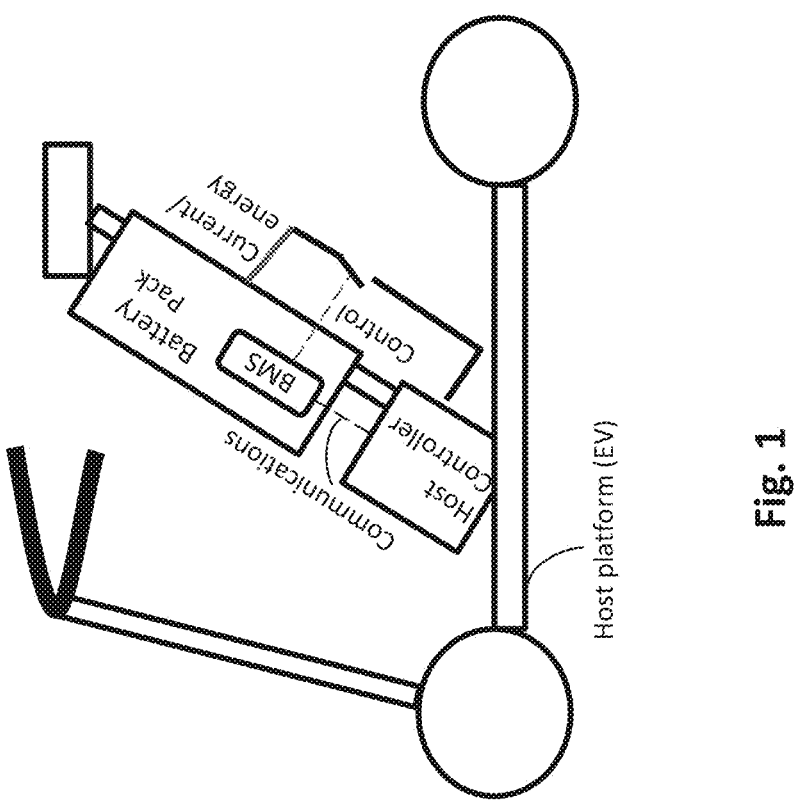
FIG. 1 shows an exemplary integration of a battery pack into a host platform (e.g., EV), according to conventional techniques.

FIG. 1 shows an exemplary integration of a battery pack into a host platform (e.g., EV) according to conventional techniques. Although the host platform/EV is illustrated in FIG. 1 as a scooter, this is only used to exemplify any type of EV, such as others described herein. As shown in FIG. 1, the host platform includes a host controller and the battery pack includes a BMS. The host controller can include one or more processors, memories, communication interfaces, etc. can be integrated into the host platform, e.g., as an electronics module. The host controller and BMS can communicate via a wired communications interface, such as any type of wired communications bus known to skilled persons to be suitable for this application.

The BMS can also control the flow of current and/or energy from the battery pack to the host platform. In general, the BMS can control this flow based on conditions internal to the battery pack and/or commands from the host controller via the communications interface. As discussed above, the current/energy flow and the communications interface can be on the same or different connectors on the battery pack.

Figure 2A:
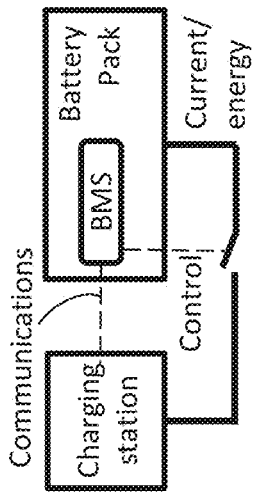
FIG. 2A shows an exemplary integration of the battery pack shown in FIG. 1 with a charging station host platform.

As briefly mentioned above, electric vehicles (EVs) are increasingly being used in shared-vehicle services, including scooter-sharing services such as Lime, Bird, etc. These services often include many identical EVs with battery packs that are removable to facilitate charging, maintenance, and replacement. FIG. 2A shows an exemplary integration of the battery pack shown in FIG. 1 with a charging station host platform, according to conventional techniques. In contrast to FIG. 1, the energy/current flow is from the charging station to the battery pack. The charging station can also communicate with the BMS via the communication interface. The charging station can be located in various places that may or may not be under the control of the battery pack manufacturer or the shared-vehicle service provider.

Figure 2B:
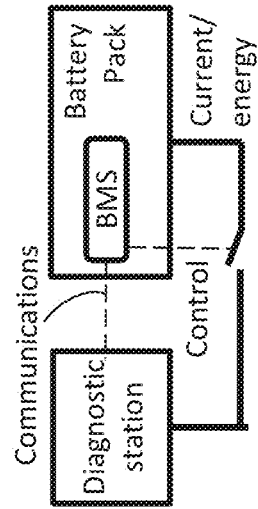
FIG. 2B shows an exemplary integration of the battery pack shown in FIG. 1 with a diagnostic station host platform.

FIG. 2B shows an exemplary integration of the battery pack shown in FIG. 1 with a diagnostics station host platform, according to conventional techniques. The diagnostic station can also communicate with the BMS via the communication interface. The diagnostics station shown in FIG. 2B can be in the battery pack factory, in a manufacturer service depot, in a field service depot, etc., each of which may have different diagnostic and/or service capabilities. Depending on the particular arrangement, the energy/current flow in FIG. 2B may be in one or both directions, or may not occur (e.g., battery pack and diagnostic station are self-powered).

However, there are some challenges when EVs with removable battery packs are used in shared-vehicle services. First, plugging and unplugging the battery pack's wiring harness and/or connectors will introduce wear and tear on the connectors which will significantly reduce the lifetime of the battery pack. Second, waterproofing the connectors can be difficult, such that the ingress protection (IP) of the battery may be insufficient. Third, since shared EVs are usually left unattended, their removable battery packs can be easily stolen and used on other vehicles illegally or for other purposes. Solutions to these issues are needed to facilitate wider adoption of EVs in shared-vehicle services.

Exemplary embodiments of the present disclosure can address these and other issues, problems, and/or difficulties by utilizing a short-range wireless connection (e.g., near-field communications, NFC) between the battery pack and the host platform to mutually authenticate each other and to perform various actions based on successful authentication. For example, such actions can include enabling or disabling the flow of energy between the battery and the host platform, controlling further communications with host platform via the short-range wireless connection, etc. In addition to EV host platforms, such embodiments can also be used with other host platforms, such as charging stations, diagnostic stations, etc. to facilitate authorized charging, diagnostics, maintenance, etc. of the battery pack.

Figure 3:
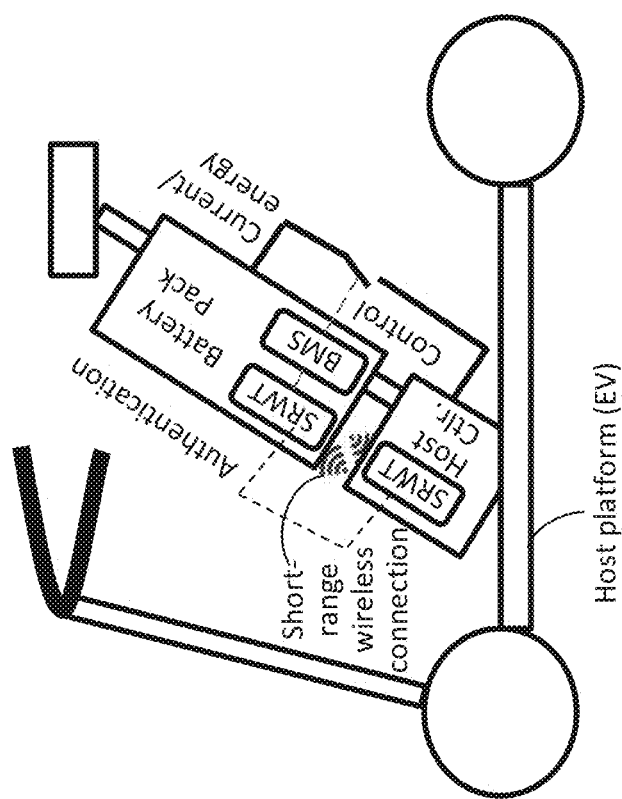
FIG. 3 shows an exemplary integration of a battery pack into a host platform (e.g., EV), according to various embodiments of the present disclosure.

FIG. 3 shows an exemplary integration of a battery pack into a host platform (e.g., EV) according to embodiments of the present disclosure. Although the host platform/EV is illustrated in FIG. 3 as a scooter, this is only used to exemplify any type of EV, such as others described herein. Other than specific features described below, the host controller and the battery pack can be similar to the ones shown in and described above in relation to FIGS. 1-2.

As shown in FIG. 3, the host controller and BMS can communicate via a short-range wireless connection. This short-range wireless connection can take the place of a wired communication bus, such as described above in relation to FIGS. 1-2. To facilitate communication via the short-range wireless connection, both the battery pack and the host platform can include compatible short-range wireless transceivers (SRWTs). In various embodiments, the SRWT can be part of the BMS or separate from the BMS, and/or part of the host controller or separate from the host controller. In some embodiments, the SRWTs can support near-field communications (NFC), which can be used as a bearer for information exchanged over the short-range wireless connection.

As shown in FIG. 3, authentication operations can also take place over the short-range wireless connection. In some embodiments, these authentication operations can include mutual authentication, where the battery pack (or BMS) authenticates the host platform (or host controller), and the host platform (or host controller) authenticates the battery pack (or BMS). In general, authentication operations in each entity can be divided into the following categories:

Verifying that the other entity is who or what it claims to be, e.g., based on matching credentials provided by the other entity with corresponding credentials stored locally in a credential storage medium (e.g., SIM card or other tamper-proof medium); and Once verified, establishing an authentication level based on respective capabilities of the two entities (e.g., models, versions, SKUs, releases, etc.).

In some embodiments, the authentication between the battery pack and the host platform can be initiated automatically when the two are proximate enough that the respective SRWTs can discover and communicate with each other. In other embodiments, the authentication can be initiated manually, such as by a user or operator input.

In various embodiments, the SRWT can act as the "main power switch" of the battery pack and control the energy flow to/from the battery pack. In various embodiments, the SRWT can do this by itself or in conjunction with the BMS (e.g., a controller in the BMS); however, the following discussion will refer to the SRWT to simplify explanation. If the host platform is successfully authenticated to some level (e.g., full or partial authentication), the SRWT can enable further communication between host platform and BMS over the short-range wireless connection, such as to exchange control and status information. For example, this information can be exchanged via a serial communications protocol, such as I2C. In addition, the SRWT can enable the flow of energy between the battery pack and the host platform.

In some embodiments, the SRWTs can support multiple short-range wireless technologies for the short-range wireless connection. In these embodiments, the authentication can take place using a first wireless technology (e.g., NFC) and the further communications can take place using a second wireless technology (e.g., Bluetooth).

On the other hand, if the host platform is not authenticated, the SRWT can disable further communication between host platform and BMS over the short-range wireless connection, and disable the flow of energy between the battery pack and the host platform. In the case of the EV host platform shown in FIG. 3, the SRWT will enable or disable the flow of energy from the battery pack to the host platform.

Figure 4A:
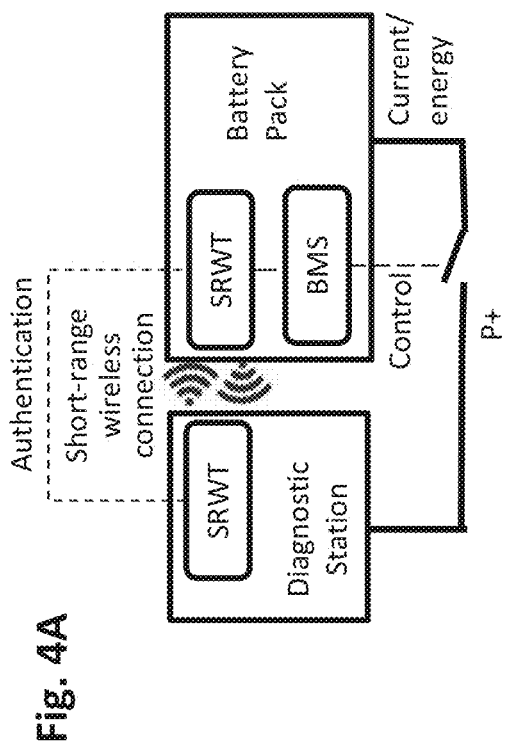
FIG. 4A shows an exemplary integration of the battery pack shown in FIG. 3 with a charging station host platform, according to various embodiments of the present disclosure.

FIG. 4 shows two exemplary integrations of the battery pack of FIG. 3 into other host platforms, according to other embodiments of the present disclosure. In particular, FIG. 4A shows an exemplary integration of the battery pack shown in FIG. 3 with a charging station host platform equipped with a compatible SRWT. In other respects, the charging station can be similar to the charging station shown in FIG. 2A. Similar to the arrangement shown in FIG. 3, authentication can occur over the short-range wireless connection, with the authentication result being used by the battery pack SRWT to enable/disable energy flow into the battery and to enable/disable further communication with the charging station over the short-range wireless connection.

Figure 4B:
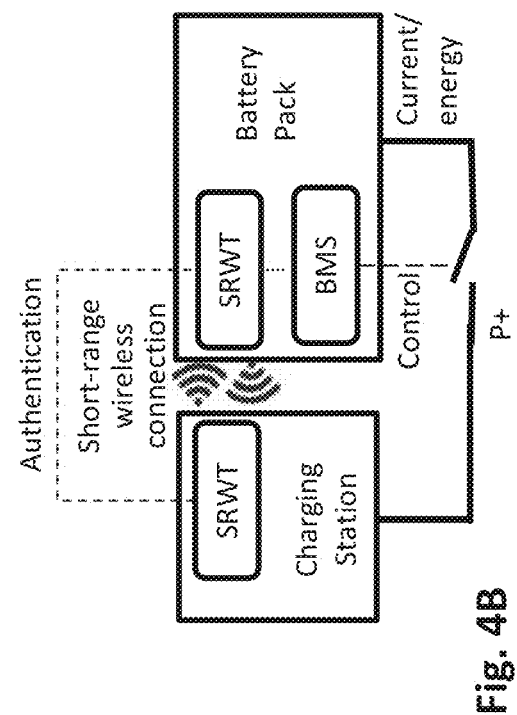
FIG. 4B shows an exemplary integration of the battery pack shown in FIG. 3 with a diagnostic station host platform, according to various embodiments of the present disclosure.

FIG. 4B shows an exemplary integration of the battery pack shown in FIG. 3 with a diagnostics station host platform equipped with a compatible SRWT. In other respects, the diagnostic station can be similar to the diagnostic station shown in FIG. 2B. Similar to the arrangement shown in FIG. 3, authentication can occur over the short-range wireless connection, with the authentication result being used by the battery pack SRWT to enable/disable further communication with the diagnostic station over the short-range wireless connection. In some embodiments, the authentication result can be used by the battery pack SRWT to enable/disable in one or both directions between the battery pack and host platform.

Figure 5:
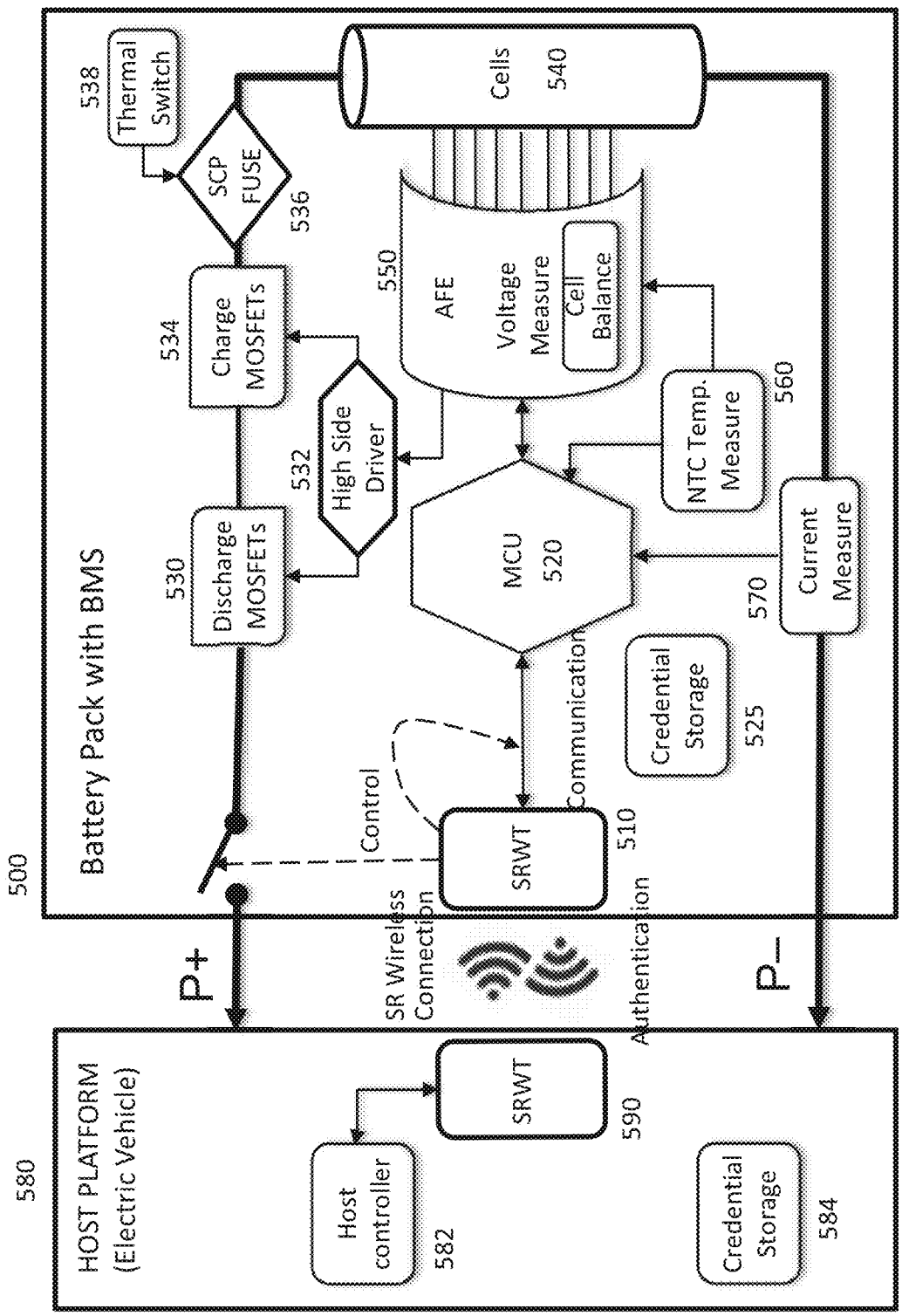
FIG. 5 shows a more detailed view of an exemplary integration of a battery pack into a host platform (e.g., EV), according to various embodiments of the present disclosure.

FIG. 5 shows a more detailed view of an exemplary integration of a battery pack into a host platform, according to embodiments of the present disclosure. In particular, FIG. 5 shows an integration of a battery pack 500 including a BMS with a host platform 580, which in this embodiment is an EV. Battery pack 500 and host platform 580 include compatible SRWTs 510 and 590, respectively. SRWTs 510 and 590 can utilize various short-range wireless technologies, such as NFC, Bluetooth, etc.

Battery pack 500 also includes rechargeable cells 540, which operate at a nominal voltage and receive, store, and provide energy in the form of current at the operating voltage over a duration of time. For example, cells 540 can be lithium (Li) ion cells, which can have relatively high energy density, relatively low rate of self-discharge, and can be relatively easy to recharge.

BMS of battery pack 500 can include a master controller unit (MCU) 520. At a high level, MCU 520 manages charging, discharging, and health of cells 540 and communicates control and status information with host platform 580. MCU 520 is electrically coupled to a current measuring device 570, a voltage measuring device 550, and an NTC temperature measuring device 560. Device 550 measures the current operating voltage of the cells and performs balancing operations with respect to the cells. Device 560 measures the current flow between cells 540 and host platform 580. Device 560 measures current operating temperature of the cells. These devices provide MCU 520 with respective status information about the operation of the battery pack.

Device 550 also facilitates charging and discharging of the cells via high side driver 532, which is connected to discharge MOSFET(s) 530 and charge MOSFET(s) 534. These MOSFETs are often used to mitigate risk of hazard or destruction of Li-Ion cells due to current or voltage above rated operated conditions. These MOSFETs in the charge and discharge paths can sever the electrical connection between the battery and the rest of the electronics when device 550 detects battery voltage outside a designated safe range, or when device 560 detects an overcurrent surge during charging or discharging. Further protection is provided by an SCP fuse 536 coupled to a thermal switch 538, which triggers electrical disconnection of the cells upon detecting an operating temperature outside a designated safe range.

In the same manner as described above, SRWT 510 can act as the "main power switch" of battery pack 500 and control the energy flow to/from the battery pack. In various embodiments, SRWT 510 can do this by itself or in conjunction with the BMS (e.g., MCU 520); however, the following discussion will refer to SRWT 510 for simplicity. If the host platform is successfully authenticated to some level (e.g., full or partial authentication), SRWT 510 can enable further communication between host platform 580 and battery pack 500 over the short-range wireless connection, such as to exchange control and status information. In addition, SRWT 510 can enable the flow of energy between battery pack 500 and host platform 580. On the other hand, if host platform 580 is not authenticated, the SRWT (or BMS) can disable further communication between host platform and BMS over the short-range wireless connection, and disable the flow of energy between the battery pack and the host platform.

In various embodiments, the authentication can be based on comparing credentials presented by the host platform against credentials stored in credential storage 525 (e.g., memory or SIM card) on battery pack 500. In some embodiments, host platform 580 can also include a host controller 582, which can be similar to the host controllers shown in other figures. Host controller 582 can communicate with SRWT 590 in a similar manner as the communications between MCU 520 and SRWT 510 in the battery pack. Furthermore, host platform can also include a credential storage 584, which can be similar to credential storage 525 in the battery pack. As such, the host platform (e.g., host control 582) can authenticate battery pack 500 based on comparing credentials presented by the battery pack against credentials stored in credential storage 584. Similarly, the host platform can determine an authentication level for battery pack 500 based on comparing capabilities and/or characteristics of the battery pack against capabilities and/or characteristics of the host platform.

Credentials can include encryption keys, digital certificates, passwords, PINs, identifiers, encrypted identifiers, etc.

In addition, an authentication level can be determined based on comparing capabilities and/or characteristics of the host platform against capabilities and/or characteristics of the battery pack. Various capabilities and/or characteristics can be used in these comparisons, such as type, model (e.g., SKU), serial number, group, version, capacity, charge/discharge rate, etc.

For example, a particular model of host platform (e.g., EV) can be authenticated to communicate with a particular type and/or model of battery pack, e.g., in a many-to-many relationship. As another example, a specific battery pack can be limited to communicating with a specific host platform, e.g., in a one-to-one relationship. As a further example, a specific battery pack can be limited to communicating with a specific model of host platform, e.g., in a one-to-many relationship such as in a fleet of shared vehicles.

In some embodiments, both host platform 580 and battery pack 500 perform authentication of the other entity via the short-range wireless connection; this process is referred to as "mutual authentication." In other embodiments, only one of host platform 580 and battery pack 500 performs authentication of the other entity.

Figure 6:
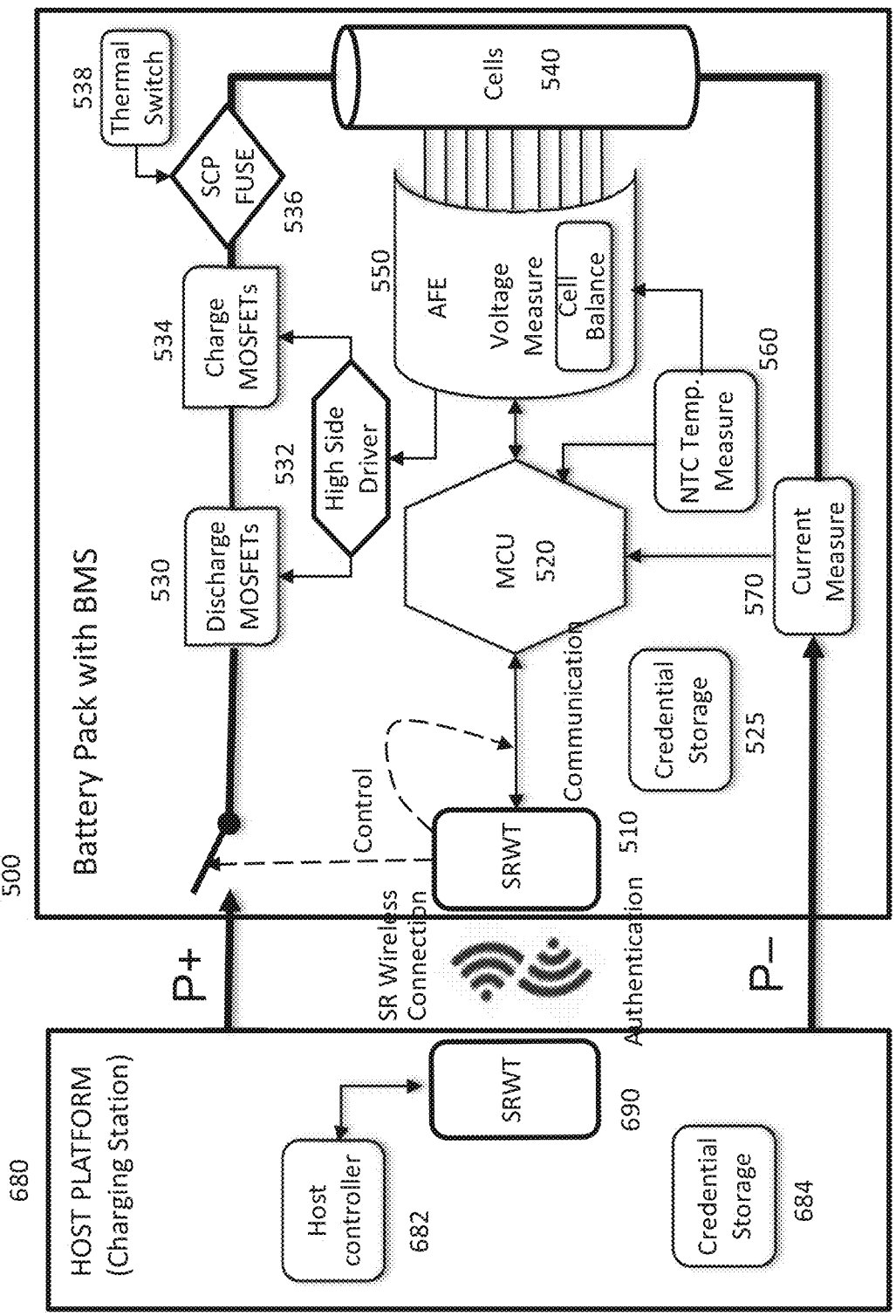
FIGS. 6-7 show more detailed views of an exemplary integration of the battery pack shown in FIG. 5 with other host platforms, according to various embodiments of the present disclosure.

FIG. 6 shows a more detailed view of an exemplary integration of a battery pack into another host platform, according to other embodiments of the present disclosure. In particular, FIG. 5 shows an integration of a battery pack 500 including a BMS with a host platform 680, which in this embodiment is a charging station. Battery pack 500 can be the same as, or substantially identical to, battery pack 500 shown in FIG. 5. Battery pack 500 and host platform 680 include compatible SRWTs 510 and 690, respectively. SRWT 690 can utilize various short-range wireless technologies, such as NFC, Bluetooth, etc. In addition, host platform 680 can include host controller 682 and credential storage medium 684, which can be perform similar functions as host controller 582 and credential storage 584 in FIG. 5.

The authentication-based control of energy flow and communications between battery pack 500 and host platform 680 can be performed in the same manner as described above for FIG. 5, with one difference being that any energy flow is from host platform 680 to battery pack 500. In the case of a charging station host platform, if the authentication is successful, the host platform can be allowed to read some or all of the battery information, parameters, and/or status, including identifiers of serial number/model number/etc., hardware and software versions, manufacturer data, diagnostic data, error codes, battery usage history, etc. Similarly, the host platform can be enabled to send various commands and/or control information to the battery pack, such as to control the recharging process. In some cases, authentication can grant the charging station additional privileges toward the battery pack, such as recalibration of the cells and/or measurements, updating firmware, downloading and/or running various tests, etc. The degree to which the host charging station is allowed to read and write to the battery pack can be based on the model and/or type of charging station.

Likewise, an incompatible charging station may not be authenticated and thereby denied read and write access to the battery pack. Similarly, a particular type or model of host charging station may be given only read and/or write privileges that are necessary to facilitate the recharging of the battery.

Figure 7:
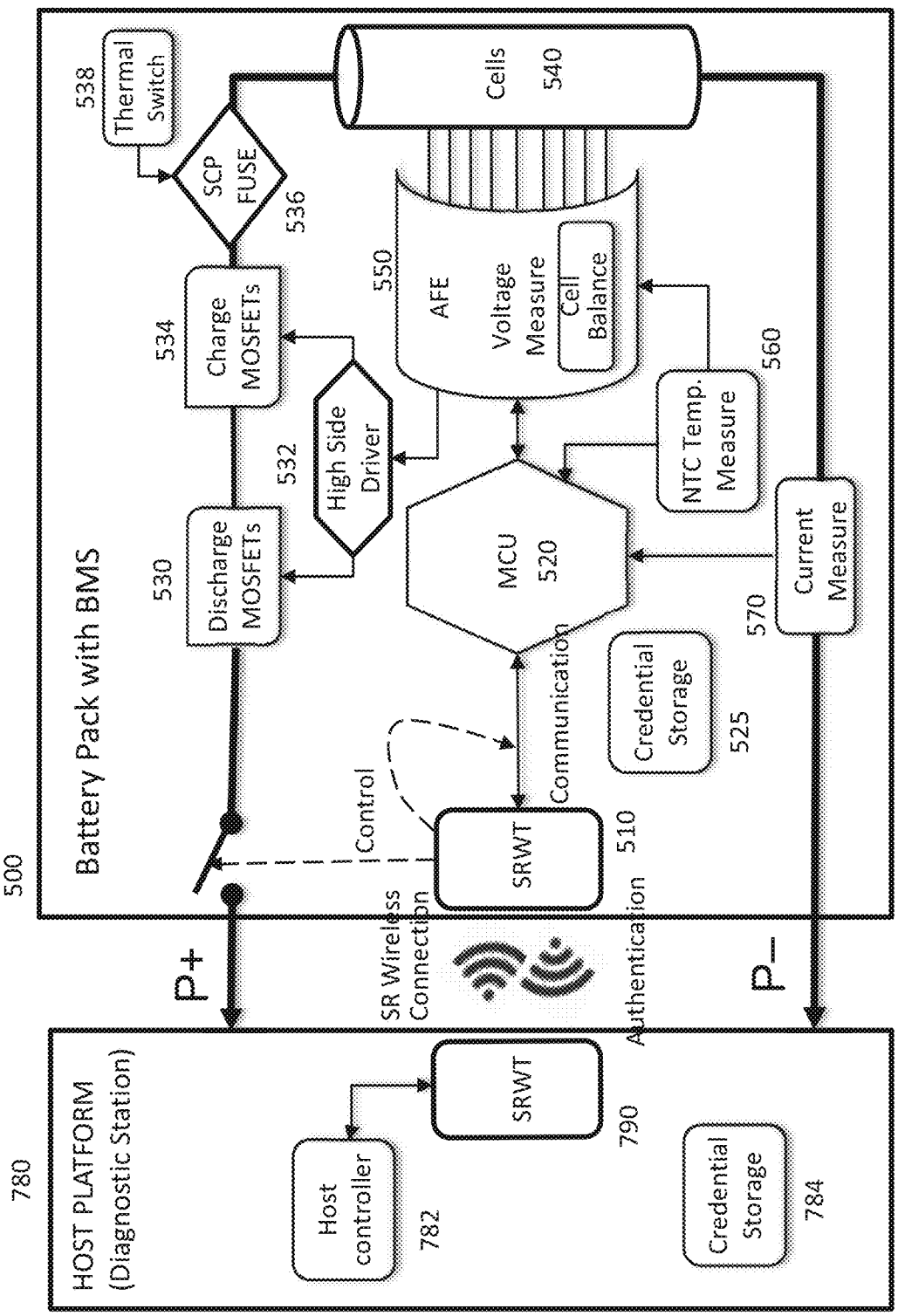

FIG. 7 shows a more detailed view of an exemplary integration of a battery pack into another host platform, according to other embodiments of the present disclosure. In particular, FIG. 7 shows an integration of a battery pack 500 including a BMS with a host platform 780, which in this embodiment is a diagnostic station. Battery pack 500 can be the same as, or substantially identical to, battery pack 500 shown in FIGS. 5-6. Battery pack 500 and host platform 780 include compatible SRWTs 510 and 790, respectively. SRWT 790 can utilize various short-range wireless technologies, such as NFC, Bluetooth, etc. In addition, host platform 780 can include host controller 782 and credential storage medium 784, which can be perform similar functions as host controllers 582, 682 and credential storages 584, 684 in FIGS. 5-6.

The authentication-based control of energy flow and communications between battery pack 500 and host platform 780 can be performed in the same manner as described above for FIG. 5, with one difference being that any energy flow can be in one or both directions between host platform 680 and battery pack 500, or may not occur at all.

In the case of a diagnostic station host platform, if the authentication is successful, the host platform can be allowed to read some or all of the battery information, parameters, and/or status, including identifiers of serial number/model number/etc., hardware and software versions, manufacturer data, diagnostic data, error codes, battery usage history, etc. Similarly, the host platform can be enabled to send various commands and/or control information to the battery pack, such as for recalibration of the cells and/or measurements, updating firmware, downloading and/or running various tests, etc.

The degree to which the host diagnostic station is allowed to read and write to the battery pack can also be based on type of host diagnostic station. For example, a factory diagnostic station can be fully authenticated, which can facilitate full reading and writing privileges toward the batter pack. In contrast, a field diagnostic station can be partially authenticated, which can facilitate only a subset of reading and/or writing privileges toward the battery pack.

Although the above description has focused on authentication of the host platform by the battery pack, in other embodiments the battery pack can be authenticated by the host platform using similar techniques as described above. The authentication by the host platform can be performed by the SRWT and/or by a host controller in communication with the SRWT.

If the battery pack is successfully authenticated to some level (e.g., full or partial authentication), the host SRWT can enable further communication between host platform and battery pack over the short-range wireless connection, such as to exchange control and status information. In addition, the host SRWT can enable the flow of energy between the battery pack and the host platform.

On the other hand, if the battery pack is not authenticated, the host SRWT can disable further communication between host platform and BMS over the short-range wireless connection, and can disable the flow of energy between the battery pack and the host platform. For example, the host platform can control a switch that isolates the host battery connector from the remainder of the host platform. As a more specific example, a battery that is incompatible with a charging station may not be authenticated, such that the charging station disables flow of energy to (i.e., refrains from charging) the battery. A similar outcome may result if the charging station determines, during authentication, that the battery has been reported as stolen or is on a "prohibited list" for some reason.

Embodiments were described above based on a short-range wireless connection via compatible SRWTs, which can be used instead of a wired communication bus between the battery pack (e.g., BMS) and the host platform (e.g., EV). Even so, principles of these embodiments can also be applied to a wired communication bus between the battery pack and the host platform. For example, each of the BMS and the host platform can authenticate the other over the wired communication bus, e.g., using the same or similar authentication protocols as for a wireless connection. The outcome of the authentication over the wired communication bus can control further operations in the same manner described above.

Figure 8:
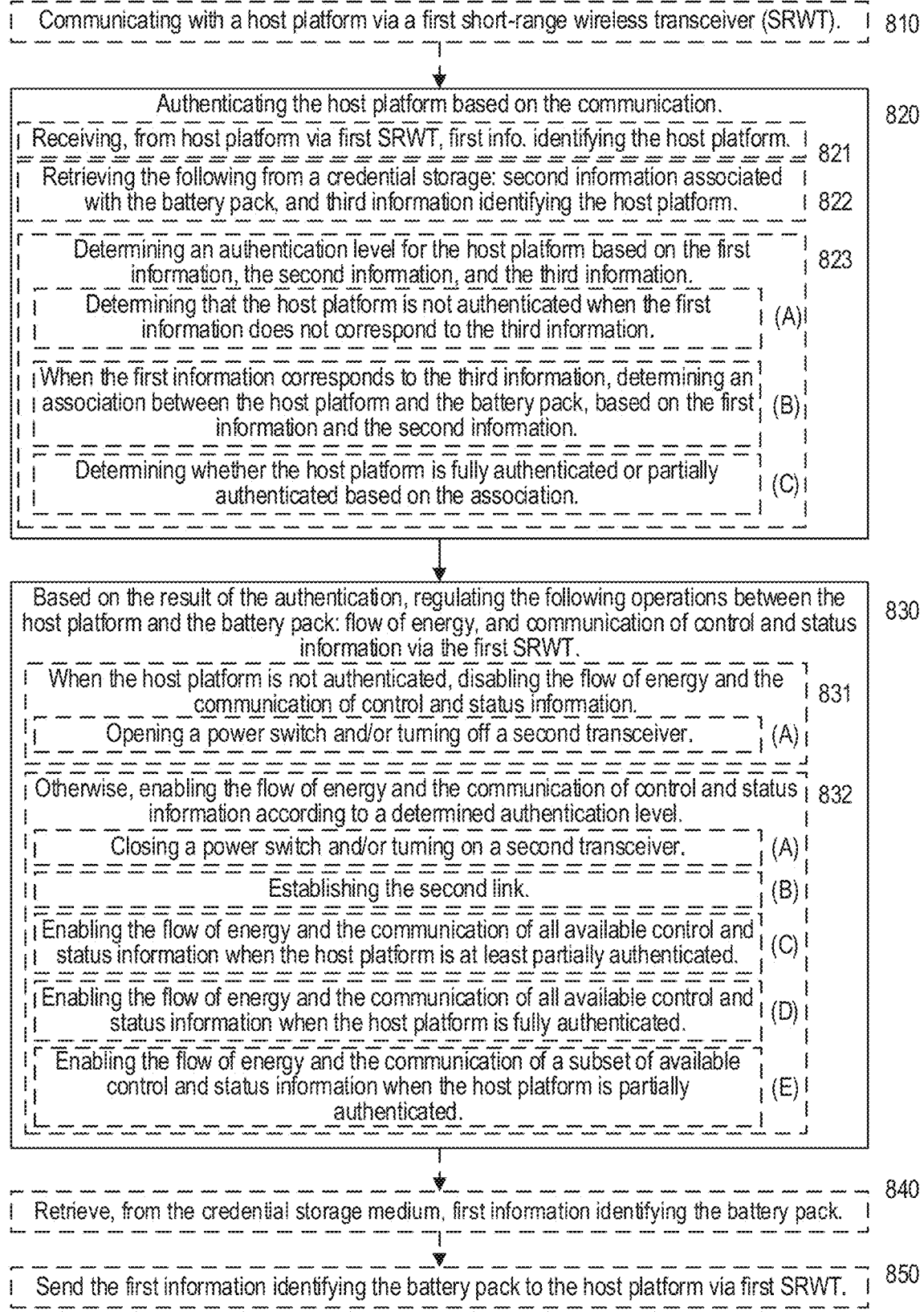
FIG. 8 is a flow diagram illustrating exemplary methods (e.g., procedures) for a battery management system (BMS) of a battery pack configured to operate with a host platform, according to various embodiments of the present disclosure.
Figure 9:
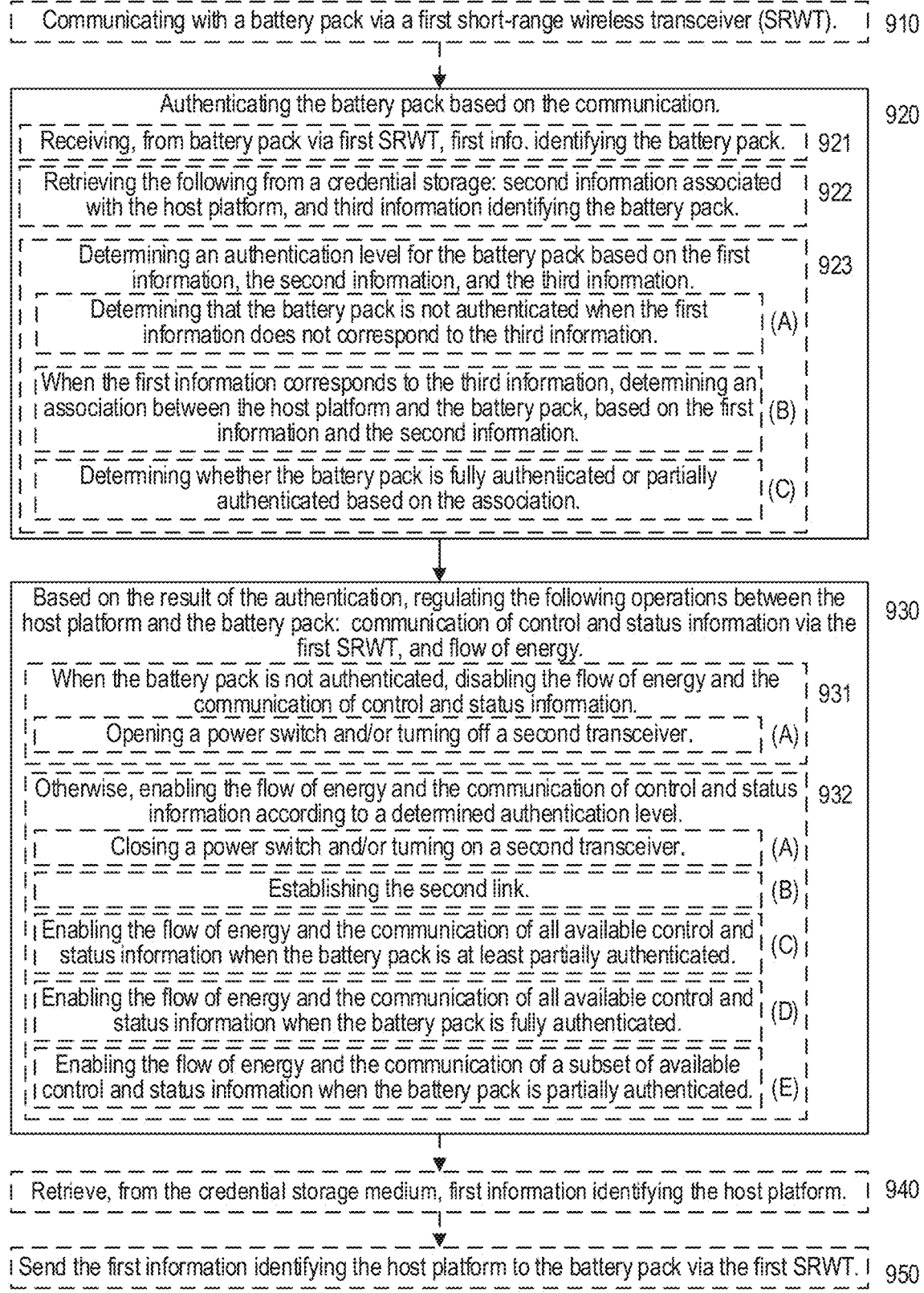
FIG. 9 is a flow diagram illustrating exemplary methods (e.g., procedures) for a host platform (e.g., EV, charging station, diagnostic station, etc.) configured to operate with a removable battery pack, according to various embodiments of the present disclosure.

The embodiments described above can be further illustrated with reference to FIGS. 8-9, which illustrate exemplary methods (e.g., procedures) for a battery management system (BMS) and a host platform, respectively. Put differently, various features of the operations described below correspond to various embodiments described above. Furthermore, the exemplary methods shown in FIGS. 8-9 can be used cooperatively to provide various exemplary benefits and/or advantages, including those described herein. Although FIGS. 8-9 show specific blocks in particular orders, the operations corresponding to the blocks can be performed in different orders than shown and can be combined and/or divided into blocks having different functionality than shown. Optional operations are indicated by dashed lines.

In particular, FIG. 8 is a flow diagram illustrating an exemplary method (e.g., procedure) for a BMS configured to control a battery pack configured to operate with a host platform, according to various exemplary embodiments of the present disclosure. The exemplary method shown in FIG. 8 can be implemented in a BMS shown in, or described in relation to, other figures herein.

In some embodiments, the exemplary method can include the operations of block 810, in which the BMS can communicate with the host platform via a first short-range wireless transceiver (SRWT) in the BMS and a compatible second SWRT in the host platform. The exemplary method can also include the operations of block 820, in which the BMS can authenticate the host platform based on the communication (e.g., in block 810). The exemplary method can also include the operations of block 830, in which the BMS can, based on the result of the authentication, regulate the following between the host platform and the battery pack: flow of energy, and communication of control and status information via the first SRWT.

In some embodiments, the BMS can also include a credential storage medium, or be associated with a credential storage medium in the battery pack. In such embodiments, the authenticating operations of block 820 can include the operations of sub-blocks 821-823. In sub-block 821, the BMS can receive, from the host platform via the first SRWT, first information identifying the host platform. In sub-block 822, the BMS can retrieve the following from the credential storage medium: second information associated with the battery pack, and third information identifying the host platform (e.g., credentials). In sub-block 823, the BMS can determine an authentication level for the host platform based on the first information, the second information, and the third information. In some embodiments, the determined authentication level can be one of the following: fully authenticated, not authenticated, partially authenticated.

In some embodiments, the BMS can perform the operations of sub-block 823 according to the following sub-operations:

(A) Determining that the host platform is not authenticated if the first information does not correspond to the third information.

(B) When the first information corresponds to the third information, determining an association between the host platform and the battery pack, based on the first information and the second information. For example, the determined association can be one of the following:
  specific model of host platform to group of one or more specific battery pack;
  specific version of host platform to group of one or more specific battery pack;
  specific model of host platform to specific model of battery pack;
  specific version of host platform (e.g., hardware, software, or combination) to specific model of battery pack;
  specific version of host platform (e.g., hardware, software, or combination) to specific version of battery pack (e.g., hardware, software, or combination); and
  type of host platform to any battery pack.

(C) Determining whether the host platform is fully authenticated or partially authenticated based on the association.

In some embodiments, the exemplary method can also include the operations of blocks 840-850. In block 840, the BMS can retrieve, from the credential storage medium, first information identifying the battery pack (e.g., credentials). In block 850, the BMS can send the first information identifying the battery pack to the host platform via the first SRWT. In this manner, the BMS can facilitate mutual authentication between the battery pack and the host platform.

In some embodiments, the regulating operations of block 830 can include the operations of sub-blocks 831-832. In sub-block 831, the BMS can, when the host platform is not authenticated, disable the flow of energy and the communication of control and status information. In sub-block 832, the BMS can otherwise (i.e., when host platform is fully or partially authenticated) enable the flow of energy and the communication of control and status information according to a determined authentication level.

In some embodiments, the BMS further comprises a power switch operably coupled to the battery, the controller, and a host platform interface. In such embodiments, the BMS can enable the flow of energy by closing the power switch and disable the flow of energy by opening the power switch.

In some embodiments, the first SRWT comprises a first transceiver that utilizes a first short-range wireless protocol, by which the host platform authentication is performed (e.g., the communication on which the authentication is based), and a second transceiver that utilizes a second short-range wireless protocol, by which communication of control and status information is performed. In such embodiments, the BMS can enable the communication of control and status information by turning on the second transceiver (e.g., sub-operation A in sub-block 832) and disable the communication of control and status information by turning off the second transceiver (e.g., sub-operation A in sub-block 831). Note that "turning on" can include refraining from turning off (e.g., when already on) and "turning off" can include refraining from turning on (e.g., when already off). In some embodiments, the first transceiver can be a Near-Field Communications (NFC) transceiver and the second transceiver can be a Bluetooth transceiver.

In other embodiments, the first SRWT includes only the first transceiver that is configured to communicate with the host platform (e.g., via a compatible SRWT on the host platform) via first and second links. For example, the first and second links can use the same lower-layer protocols (e.g., PHY, MAC) but can use different higher layer protocols for the respective operations and/or functions. In these embodiments, authenticating the host platform (e.g., in block 820) is performed based on communication via the first link. Likewise, enabling the communication of control and status information (e.g., in sub-block 832) comprises establishing the second link (e.g., in sub-operation B). For example, the BMS will not establish the second link when authentication is unsuccessful.

In some embodiments, the host platform can be a vehicle that is electrically coupled to the battery pack. FIG. 5 shows an example of these embodiments. In such embodiments, enabling the flow of energy and the communication of control and status information according to a determined authentication level (e.g., in sub-block 832) can include enabling the flow of energy and the communication of all available control and status information when the host platform is at least partially authenticated (e.g., sub-operation C). In some of these embodiments, the vehicle can be one of the following: a car, a truck, a bus, a scooter, a bicycle, a motorcycle, a boat, a personal watercraft, or a forklift.

In other embodiments, the host platform can be a charging station or a diagnostic station that is electrically coupled to the battery pack. FIGS. 6-7 show examples of these embodiments. In such embodiments, enabling the flow of energy and the communication of control and status information according to a determined authentication level (e.g., in sub-block 832) can include enabling the flow of energy and the communication of all available control and status information between the host platform and the battery pack when the host platform is fully authenticated (e.g., sub-operation D), and enabling the flow of energy and the communication of a subset of available control and status information between the host platform and the battery pack when the host platform is partially authenticated (e.g., in sub-operation E).

In some of these embodiments, partially authenticated can include the following levels: a first level in which communication is enabled for all available status information and communication of control information is disabled, and a second level in which communication is enabled for only a subset of available status information and communication of control information is disabled.

In addition, FIG. 9 is a flow diagram illustrating an exemplary method (e.g., procedure) for a host platform configured to operate with a removable battery pack comprising a battery and a battery management system (BMS), according to various exemplary embodiments of the present disclosure. The exemplary method shown in FIG. 9 can be implemented by a host platform (e.g., EV, charging station, diagnostic station, etc.) such as shown in, or described in relation to, other figures herein. Furthermore, the exemplary method shown in FIG. 9 can be used cooperatively with other exemplary methods described herein (e.g., FIG. 8) to provide various exemplary benefits and/or advantages, including those described herein. Although FIG. 9 shows specific blocks in a particular order, the operations corresponding to the blocks can be performed in a different order than shown and can be combined and/or divided into blocks having different functionality than shown. Optional operations are indicated by dashed lines.

In some embodiments, the exemplary method can include the operations of block 910, in which the host platform can communicate with the battery pack via a first short-range wireless transceiver (SRWT) in the host platform and a compatible second SRWT in the BMS. The exemplary method can also include the operations of block 920, in which the host platform can authenticate the battery pack based on the communication (e.g., in block 910). The exemplary method can also include the operations of block 930, in which the host platform can, based on the result of the authentication, regulate the following operations between the host platform and the battery pack: flow of energy, and communication of control and status information via the first SRWT.

In some embodiments, the host platform can also include a credential storage medium. In such embodiments, the authenticating operations of block 920 can include the operations of sub-blocks 921-923. In sub-block 921, the host platform can receive, from the battery pack via the first SRWT, first information identifying the battery pack. In sub-block 922, the host platform can retrieve the following from the credential storage medium: second information associated with the host platform, and third information identifying the battery pack (e.g., credentials). In sub-block 923, the host platform can determine an authentication level for the battery pack based on the first information, the second information, and the third information. In some embodiments, the determined authentication level can be one of the following: fully authenticated, not authenticated, partially authenticated.

In some embodiments, the host platform can perform the operations of sub-block 923 according to the following sub-operations:

(A) Determining that the battery pack is not authenticated if the first information does not correspond to the third information.

(B) When the first information corresponds to the third information, determining an association between the host platform and the battery pack, based on the first information and the second information. For example, the determined association can be one of the following:

specific model of host platform to group of one or more specific battery pack;
specific version of host platform to group of one or more specific battery pack;
specific model of host platform to specific model of battery pack;
specific version of host platform (e.g., hardware, software, or combination) to specific model of battery pack;
specific version of host platform (e.g., hardware, software, or combination) to specific version of battery pack (e.g., hardware, software, or combination); and
type of host platform to any battery pack.

(C) Determining whether the battery pack is fully authenticated or partially authenticated based on the association.

In some embodiments, the exemplary method can also include the operations of blocks 940-950. In block 940, the host platform can retrieve, from the credential storage medium, first information identifying the host platform (e.g., credentials). In block 950, the host platform can send the first information identifying the host platform to the battery pack via the SRWT. In this manner, the host platform can facilitate mutual authentication between the battery pack and the host platform.

In some embodiments, the regulating operations of block 930 can include the operations of sub-blocks 931-932. In sub-block 921, the host platform can, when the battery pack is not authenticated, disable the flow of energy and the communication of control and status information. In sub-block 932, the host platform can otherwise (i.e., when battery pack is fully or partially authenticated) enable the flow of energy and the communication of control and status information according to a determined authentication level.

In some embodiments, the host platform further comprises a power switch operably coupled to a battery pack interface (e.g., power connector). In such embodiments, the host platform can enable the flow of energy by closing the power switch and disable the flow of energy by opening the power switch.

In some embodiments, the first SRWT comprises a first transceiver that utilizes a first short-range wireless protocol, by which the battery pack authentication is performed (e.g., the communication on which the authentication is based), and a second transceiver that utilizes a second short-range wireless protocol, by which communication of control and status information is performed. In such embodiments, the host platform can enable the communication of control and status information by turning on the second transceiver (e.g., sub-operation A in sub-block 932) and disable the communication of control and status information by turning off the second transceiver (e.g., sub-operation A in sub-block 931). Note that "turning on" can include refraining from turning off (e.g., when already on) and "turning off" can include refraining from turning on (e.g., when already off). In some embodiments, the first transceiver can be a Near-Field Communications (NFC) transceiver and the second transceiver can be a Bluetooth transceiver.

In other embodiments, the first SRWT includes only the first transceiver that is configured to communicate with the battery pack (e.g., via a compatible SRWT in or associated with the battery pack) via first and second links. For example, the first and second links can use the same lower-layer protocols (e.g., PHY, MAC) but can use different higher layer protocols for the respective operations and/or functions. In these embodiments, authenticating the battery (e.g., in block 920) is performed based on communication via the first link. Likewise, enabling the communication of control and status information (e.g., in sub-block 932) comprises establishing the second link (e.g., in sub-operation B). For example, the host platform will not establish the second link when authentication is unsuccessful.

In some embodiments, the host platform can be a vehicle that is electrically coupled to the battery pack. FIG. 5 shows an example of these embodiments. In such embodiments, enabling the flow of energy and the communication of control and status information according to a determined authentication level (e.g., in sub-block 932) can include enabling the flow of energy and the communication of all available control and status information when the battery pack is at least partially authenticated (e.g., sub-operation C). In some of these embodiments, the vehicle can be one of the following: a car, a truck, a bus, a scooter, a bicycle, a motorcycle, a boat, a personal watercraft, or a forklift.

In other embodiments, the host platform can be a charging station or a diagnostic station that is electrically coupled to the battery pack. FIGS. 6-7 show examples of these embodiments. In such embodiments, enabling the flow of energy and the communication of control and status information according to a determined authentication level (e.g., in sub-block 932) can include enabling the flow of energy and the communication of all available control and status information between the host platform and the battery pack when the battery pack is fully authenticated (e.g., sub-operation D), and enabling the flow of energy and the communication of a subset of available control and status information between the host platform and the battery pack when the battery pack is partially authenticated (e.g., in sub-operation E).

In some of these embodiments, partially authenticated can include the following levels: a first level in which communication is enabled for all available status information and communication of control information is disabled, and a second level in which communication is enabled for only a subset of available status information and communication of control information is disabled.

Although various embodiments are described above in terms of methods, techniques, and/or procedures, the person of ordinary skill will readily comprehend that such methods, techniques, and/or procedures can be embodied by various combinations of hardware and software in various BMS, battery packs, host platforms, non-transitory computer-readable media, computer program products, etc. For example, the methods (e.g., procedures) shown in FIGS. 8-9 can be embodied as executable instructions (e.g., computer program products) stored in a non-transitory, computer-readable medium (e.g., non-volatile computer memory). Furthermore, execution of such instructions by processing circuitry (e.g., programmable processor(s)) can cause and/or configure a BMS, battery pack, or host platform to perform operations corresponding to the methods shown in those figures.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Embodiments of the techniques and apparatus described herein also include, but are not limited to, the following enumerated examples:

E1. A battery management system (BMS) for a battery pack configured to operate with a host platform, the BMS comprising:
  a short-range wireless transceiver (SRWT); and
  a controller, operably coupled to the SRWT and configured to:
    authenticate a host platform via communication with a compatible SRWT on the host platform; and
    based on the result of the authentication, regulate the following operations between the host platform and the battery pack:
      communication of control and status information via the SRWT, and
      flow of energy between the battery pack and the host platform.

E2. The BMS of embodiment E1, further comprising a credential storage medium, wherein the controller is configured to authenticate the host platform based on:
  receiving, from the host platform via the SRWT, first information identifying the host platform;
  retrieving the following from the credential storage medium:
    second information associated with the battery pack, and
    third information identifying the host platform; and
  determining an authentication level for the host platform based on the first information, the second information, and the third information.

E3. The BMS of embodiment E2, wherein the determined authentication level is one of the following: fully authenticated, not authenticated, partially authenticated.

E4. The BMS of any of embodiments E2-E3, wherein the controller is further configured to determine the authentication level by determining that the host platform is not authenticated if the first information does not correspond to the third information.

E5. The BMS of embodiment E4, wherein the controller is further configured to, when the first information corresponds to the third information, determine the authentication level by:
  determining an association between the host platform and the battery pack, based on the first information and the second information; and
  determining whether the host platform is fully authenticated or partially authenticated based on the association.

E6. The BMS of embodiment E5, wherein the determined association is one of the following:
  specific host platform to group of one or more specific battery pack;
  specific model of host platform to group of one or more specific battery pack;
  specific version of host platform to group of one or more specific battery pack;
  specific model of host platform to specific model of battery pack;
  specific version of host platform to specific model of battery pack;
  specific version of host platform to specific version of battery pack; and
  type of host platform to any battery pack.

E7. The BMS of any of embodiments E2-E6, wherein the controller is further configured to:
  retrieve, from the credential storage medium, first information identifying the battery pack; and
  send the first information identifying the battery pack to the host platform via the SRWT.

E8. The BMS of any of embodiments E1-E7, wherein the controller is configured to regulate based on the result of the authentication by:
  when the host platform is not authenticated, disabling the flow of energy and the communication of control and status information; and
  otherwise, enabling the flow of energy and the communication of control and status information according to a determined authentication level.

E9. The BMS of embodiment E8, wherein:
  the BMS further comprises a power switch operably coupled to the battery, the controller, and a host platform interface; and
  the controller is configured to enable the flow of energy by closing the power switch and to disable the flow of energy by opening the power switch.

E10. The BMS of embodiment E8, wherein:
  the SRWT comprises:
    a first transceiver that utilizes a first short-range wireless protocol, by which the host platform authentication is performed; and
    a second transceiver that utilizes a second short-range wireless protocol, by which communication of control and status information is performed; and the controller is configured to enable the communication of control and status information by turning on the second transceiver and to disable the communication of control and status information by turning off the second transceiver.

E11. The BMS of embodiment E10, wherein the first transceiver is a Near-Field Communications (NFC) transceiver, and the second transceiver is a Bluetooth transceiver.

E11a. The BMS of embodiment E8, wherein:
the SRWT comprises a first transceiver that is configured to communicate with the host platform via first and second links; and
the controller is configured to:
authenticate the host platform via the first link, and
enable the communication of control and status information by establishing the second link.

E12. The BMS of any of embodiments E1-E11a, wherein:
the host platform is a vehicle that is electrically coupled to the battery pack; and
the controller is configured to regulate based on the result of the authentication by:
disabling the communication of control and status information and the flow of energy from the battery pack to the vehicle when the vehicle is not authenticated; and
otherwise enabling the flow of energy from the battery pack to the vehicle and the communication of control and status information.

E13. The BMS of embodiment E12, wherein the vehicle is one of the following: a car, a truck, a bus, a scooter, a bicycle, a motorcycle, a boat, a personal watercraft, or a forklift.

E14. The BMS of any of embodiments E1-E11a, wherein:
the host platform is a charging station that is electrically coupled to the battery pack; and
the controller is configured to regulate based on the result of the authentication by:
disabling the communication of control and status information and the flow of energy from the charging station to the battery when the charging station is not authenticated; and
otherwise:
enabling the flow of energy from the charging station to the battery pack, and
enabling the communication of control and status information according to a determined authentication level.

E15. The BMS of any of embodiments E1-E11a, wherein:
the host platform is a diagnostic station that is electrically coupled to the battery pack; and
the controller is configured to regulate based on the result of the authentication by:
disabling the communication of control and status information and the flow of energy between the diagnostic station and the battery pack when the diagnostic station is not authenticated; and
otherwise:
enabling the flow of energy between the diagnostic station and the battery pack, and
enabling the communication of control and status information according to a determined authentication level.

E16. The BMS of any of embodiments E14-E15, wherein the diagnostic station or the charging station is one of the following:
a fully authenticated station, such that communication of all available control and status information is enabled; or
a partially authenticated station, such that communication is enabled for only a subset of available control and status information.

E16a. The BMS of embodiment E16, wherein partially authenticated comprises the following levels:
a first level in which communication is enabled for all available status information and communication of control information is disabled; and
a second level in which communication is enabled for only a subset of available status information and communication of control information is disabled.

E17. A battery pack comprising:
a plurality of rechargeable cells configured to store energy for use by a host platform; and
the BMS of any of embodiments E1-E16a, further configured to control the plurality of cells.

E18. A method of operating a battery management system (BMS) configured to control a battery pack for use with a host platform, the method comprising:
communicating with the host platform via a short-range wireless transceiver (SRWT);
authenticating the host platform based on the communication; and
based on the result of the authentication, regulating the following operations between the host platform and the battery pack:
communication of control and status information via the SRWT, and
flow of energy between the battery pack and the host platform.

E19. The method of embodiment E18, wherein authenticating the host platform further comprises:
receiving, from the host platform via the SRWT, first information identifying the host platform;
retrieving the following from a credential storage associated with the BMS:
second information associated with the battery pack, and
third information identifying the host platform; and
determining an authentication level for the host platform based on the first information, the second information, and the third information.

E20. The method of embodiment E19, wherein the determined authentication level is one of the following: fully authenticated, not authenticated, partially authenticated.

E21. The method of any of embodiments E19-E20, wherein determining the authentication level further comprises determining that the host platform is not authenticated if the first information does not correspond to the third information.

E22. The method of embodiment E21, wherein determining the authentication level further comprises, when the first information corresponds to the third information:
determining an association between the host platform and the battery pack, based on the first information and the second information; and
determining whether the host platform is fully authenticated or partially authenticated based on the association.

E23. The method of embodiment E22, wherein the determined association is one of the following:
specific host platform to group of one or more specific battery pack;
specific model of host platform to group of one or more specific battery pack;
specific version of host platform to group of one or more specific battery pack;
specific model of host platform to specific model of battery pack;

specific version of host platform to specific model of battery pack;
specific version of host platform to specific version of battery pack; and
type of host platform to any battery pack.

E24. The method of any of embodiments E19-E23, further comprising:
retrieving, from the credential storage medium, first information identifying the battery pack; and
sending the first information identifying the battery pack to the host platform via the SRWT.

E25. The method of any of embodiments E18-E24, wherein regulating based on the result of the authentication further comprises:
when the host platform is not authenticated, disabling the flow of energy and the communication of control and status information; and
otherwise, enabling the flow of energy and the communication of control and status information according to a determined authentication level.

E26. The method of embodiment E25, wherein:
enabling the flow of energy comprises closing a power switch operably coupled to the battery and a host platform interface; and
disabling the flow of energy comprises opening the power switch.

E27. The method of embodiment E25, wherein:
the SRWT comprises:
a first transceiver that utilizes a first short-range wireless protocol, by which the host platform authentication is performed; and
a second transceiver that utilizes a second short-range wireless protocol, by which communication of control and status information is performed; and
enabling the communication of control and status information comprises turning on the second transceiver and disabling the communication of control and status information comprises turning off the second transceiver.

E28. The method of embodiment E27, wherein the first transceiver is a Near-Field Communications (NFC) transceiver, and the second transceiver is a Bluetooth transceiver.

E28a. The method of embodiment E25, wherein:
the SRWT comprises a first transceiver that is configured to communicate with the host platform via first and second links;
authenticating the host platform is performed via the first link; and
enabling the communication of control and status information comprises establishing the second link.

E29. The method of any of embodiments E18-E28a, wherein:
the host platform is a vehicle that is electrically coupled to the battery pack; and
regulating based on the result of the authentication comprises:
disabling the communication of control and status information and the flow of energy from the battery pack to the vehicle when the vehicle is not authenticated; and
otherwise, enabling the flow of energy from the battery pack to the vehicle and the communication of control and status information.

E30. The method of embodiment E29, wherein the vehicle is one of the following: a car, a truck, a bus, a scooter, a bicycle, a motorcycle, a boat, a personal watercraft, or a forklift.

E31. The method of any of embodiments E18-E28a, wherein:
the host platform is a charging station that is electrically coupled to the battery pack; and
regulating based on the result of the authentication comprises:
disabling the communication of control and status information and the flow of energy from the charging station to the battery pack when the charging station is not authenticated; and
otherwise:
enabling the flow of energy from the charging station to the battery pack, and
enabling the communication of control and status information according to a determined authentication level.

E32. The method of any of embodiments E18-E28a, wherein:
the host platform is a diagnostic station that is electrically coupled to the battery controlled by the BMS; and
regulating based on the result of the authentication comprises:
disabling the communication of control and status information and the flow of energy between the diagnostic station and the battery pack when the diagnostic station is not authenticated; and
otherwise:
enabling the flow of energy between the diagnostic station and the battery pack, and
enabling the communication of control and status information according to a determined authentication level.

E33. The method of any of embodiments E31-E32, wherein the diagnostic station or the charging station is one of the following:
a fully authenticated station, such that communication of all available control and status information is enabled; or
a partially authenticated station, such that communication is enabled for only a subset of available control and status information.

E34. The method of embodiment E33, wherein partially authenticated comprises the following levels:
a first level in which communication is enabled for all available status information and communication of control information is disabled; and
a second level in which communication is enabled for only a subset of available status information and communication of control information is disabled.

E35. A battery management system (BMS) configured to control a battery pack for use with a host platform, the BMS being further configured to perform operations corresponding to any of embodiments E18-E34.

E36. A non-transitory, computer-readable medium storing computer-executable instructions that, when executed by a controller, configure a battery management system (BMS) to perform operations corresponding to any of embodiments E18-E34.

E37. A computer program product comprising computer-executable instructions that, when executed by a controller, configure a battery management system (BMS) to perform operations corresponding to any of embodiments E18-E34.

E38. A method of operating a host platform configured to operate with a removable battery pack comprising a battery and a battery management system (BMS), the method comprising:
communicating with the battery pack via a short-range wireless transceiver (SRWT);
authenticating the battery pack based on the communication; and based on the result of the authentication, regulating the following operations between the host platform and the battery pack:
    communication of control and status information via the SRWT, and
    flow of energy between the battery pack and the host platform.

E39. The method of embodiment E38, wherein authenticating the battery pack further comprises:
    receiving, from the battery pack via the SRWT, first information identifying the battery pack;
    retrieving the following from a credential storage associated with the BMS:
        second information associated with the host platform, and
        third information identifying the battery pack; and
    determining an authentication level for the battery pack based on the first information, the second information, and the third information.

E40. The method of embodiment E39, wherein the determined authentication level is one of the following: fully authenticated, not authenticated, partially authenticated.

E41. The method of any of embodiments E39-E40, wherein determining the authentication level further comprises determining that the battery pack is not authenticated if the first information does not correspond to the third information.

E42. The method of embodiment E41, wherein determining the authentication level further comprises, when the first information corresponds to the third information:
    determining an association between the host platform and the battery pack, based on the first information and the second information; and
    determining whether the battery pack is fully authenticated or partially authenticated based on the association.

E43. The method of embodiment E42, wherein the determined association is one of the following:
    specific host platform to group of one or more specific battery pack;
    specific model of host platform to group of one or more specific battery pack;
    specific version of host platform to group of one or more specific battery pack;
    specific model of host platform to specific model of battery pack;
    specific version of host platform to specific model of battery pack;
    specific version of host platform to specific version of battery pack; and
    type of host platform to any battery pack.

E44. The method of any of embodiments E39-E43, further comprising:
    retrieving, from the credential storage medium, first information identifying the host platform; and
    sending the first information identifying the host platform to the battery pack via the SRWT.

E45. The method of any of embodiments E38-E44, wherein regulating based on the result of the authentication further comprises:
    when the battery pack is not authenticated, disabling the flow of energy and the communication of control and status information; and
    otherwise, enabling the flow of energy and the communication of control and status information according to a determined authentication level.

E46. The method of embodiment E45, wherein:
    the host platform includes a power switch operably coupled to a battery pack interface;
    enabling the flow of energy comprises closing the power switch; and
    disabling the flow of energy comprises opening the power switch.

E47. The method of embodiment E45, wherein:
    the SRWT comprises:
        a first transceiver that utilizes a first short-range wireless protocol, by which the battery pack authentication is performed; and
        a second transceiver that utilizes a second short-range wireless protocol, by which communication of control and status information is performed; and
    enabling the communication of control and status information comprises turning on the second transceiver and disabling the communication of control and status information comprises turning off the second transceiver.

E48. The method of embodiment E47, wherein the first transceiver is a Near-Field Communications (NFC) transceiver, and the second transceiver is a Bluetooth transceiver.

E48a. The method of embodiment E45, wherein:
    the SRWT comprises a first transceiver that is configured to communicate with the battery pack via first and second links;
    authenticating the battery pack is performed via the first link; and
    enabling the communication of control and status information comprises establishing the second link.

E49. The method of any of embodiments E38-E48a, wherein:
    the host platform is a vehicle that is electrically coupled to the battery pack; and
    regulating based on the result of the authentication comprises:
        disabling the communication of control and status information and the flow of energy from the battery pack to the vehicle when the battery pack is not authenticated; and
        otherwise, enabling the flow of energy from the battery pack to the vehicle and the communication of control and status information.

E50. The method of embodiment E49, wherein the vehicle is one of the following: a car, a truck, a bus, a scooter, a bicycle, a motorcycle, a boat, a personal watercraft, or a forklift.

E51. The method of any of embodiments E38-E48a, wherein:
    the host platform is a charging station that is electrically coupled to the battery pack; and
    regulating based on the result of the authentication comprises:
        disabling the communication of control and status information and the flow of energy from the charging station to the battery pack when the battery pack is not authenticated; and
        otherwise:
            enabling the flow of energy from the charging station to the battery pack, and
            enabling the communication of control and status information according to a determined authentication level.

E52. The method of any of embodiments E38-E48a, wherein:
    the host platform is a diagnostic station that is electrically coupled to the battery pack; and regulating based on the result of the authentication comprises:
disabling the communication of control and status information and the flow of energy between the diagnostic station and the battery pack when the battery pack is not authenticated; and
otherwise:
enabling the flow of energy between the diagnostic station and the battery pack, and
enabling the communication of control and status information according to a determined authentication level.

E53. The method of any of embodiments E51-E52, wherein the battery pack is one of the following:
a fully authenticated battery pack, such that communication of all available control and status information is enabled; or
a partially authenticated battery pack, such that communication is enabled for only a subset of available control and status information.

E54. The method of embodiment E53, wherein partially authenticated comprises the following levels:
a first level in which communication is enabled for all available status information and communication of control information is disabled; and
a second level in which communication is enabled for only a subset of available status information and communication of control information is disabled.

E55. A host platform configured to operate with a removable battery pack comprising a battery and a battery management system (BMS), the host platform comprising:
a short-range wireless transceiver (SRWT); and
a controller, operably coupled to the short-range wireless transceiver and configured to perform operations corresponding to the methods of any of embodiments E38-E54.

E56. A host platform configured to operate with a removable battery pack comprising a battery and a battery management system (BMS), the host platform being further configured to perform operations corresponding to any of embodiments E38-E54.

E57. A non-transitory, computer-readable medium storing computer-executable instructions that, when executed by a controller, configure a host platform arranged to operate with a removable battery pack to perform operations corresponding to any of embodiments E38-E54.

E58. A computer program product comprising computer-executable instructions that, when executed by a controller, configure a host platform arranged to operate with a removable battery pack to perform operations corresponding to any of embodiments E38-E54.

E59. The host platform of any of embodiments E55-E56, further comprising a battery pack that includes a battery management system (BMS) according to any of embodiments E1-E16a.

The invention claimed is:

1. A battery management system (BMS) for a battery pack configured to operate with a host platform, the BMS comprising:
a first short-range wireless transceiver (SRWT); and
a controller, operably coupled to the first SRWT and configured to:
authenticate the host platform based on communication between the first SRWT and a compatible second SRWT in the host platform; and
based on the result of the authentication, regulate the following between the host platform and the battery pack: flow of energy, and communication of control and status information via the first SRWT.

2. The BMS of claim 1, further comprising a credential storage medium, wherein the controller is configured to authenticate the host platform based on:
receiving, from the host platform via the first SRWT, first information identifying the host platform;
retrieving the following from the credential storage medium:
second information associated with the battery pack, and
third information identifying the host platform; and
determining an authentication level for the host platform based on the first information, the second information, and the third information.

3. The BMS of claim 2, wherein the controller is further configured to determine the authentication level by determining that the host platform is not authenticated if the first information does not correspond to the third information.

4. The BMS of claim 3, wherein the controller is further configured to, when the first information corresponds to the third information, determine the authentication level by:
determining an association between the host platform and the battery pack, based on the first information and the second information; and
determining whether the host platform is fully authenticated or partially authenticated based on the association.

5. The BMS of claim 4, wherein the determined association is one of the following:
specific host platform to group of one or more specific battery pack;
specific model of host platform to group of one or more specific battery pack;
specific version of host platform to group of one or more specific battery pack;
specific model of host platform to specific model of battery pack;
specific version of host platform to specific model of battery pack;
specific version of host platform to specific version of battery pack; and
type of host platform to any battery pack.

6. The BMS of claim 2, wherein the controller is further configured to:
retrieve, from the credential storage medium, first information identifying the battery pack; and
send the first information identifying the battery pack to the host platform via the SRWT.

7. The BMS of claim 1, wherein the controller is configured to regulate based on the result of the authentication by:
when the host platform is not authenticated, disabling the flow of energy and the communication of control and status information; and
otherwise, enabling the flow of energy and the communication of control and status information according to a determined authentication level.

8. The BMS of claim 7, wherein:
the first SRWT comprises:
a first transceiver that utilizes a first short-range wireless protocol, by which the authentication is performed; and
a second transceiver that utilizes a second short-range wireless protocol, by which communication of control and status information is performed; and
the controller is configured to enable the communication of control and status information by turning on the second transceiver and to disable the communication of control and status information by turning off the second transceiver.

9. The BMS of claim 7, wherein:
the first SRWT comprises a first transceiver that is configured to communicate with the host platform via first and second links; and
the controller is configured to:
   authenticate the host platform via the first link, and
   enable the communication of control and status information by establishing the second link.

10. The BMS of claim 7, wherein:
the host platform is a vehicle that is electrically coupled to the battery pack; and
the controller is configured to enable the flow of energy and the communication of all available control and status information when the host platform is at least partially authenticated.

11. The BMS of claim 7, wherein:
the host platform is a charging station or a diagnostic station that is electrically coupled to the battery pack; and
the controller is configured to enable the flow of energy and the communication of control and status information according to a determined authentication level by:
   enabling the flow of energy and the communication of all available control and status information between the host platform and the battery pack when the host platform is fully authenticated; and
   enabling the flow of energy and the communication of a subset of available control and status information between the host platform and the battery pack when the host platform is partially authenticated.

12. The BMS of claim 11, wherein partially authenticated comprises the following levels:
a first level in which communication is enabled for all available status information and communication of control information is disabled; and
a second level in which communication is enabled for only a subset of available status information and communication of control information is disabled.

13. A battery pack comprising:
a plurality of rechargeable cells configured to store energy for use by a host platform; and
the BMS of claim 1, further configured to control the plurality of cells.

14. A method for a battery management system (BMS) for a battery pack configured to operate with a host platform, the method comprising:
authenticating the host platform based on communication between a first short-range wireless transceiver (SRWT) in the BMS and a compatible second SRWT in the host platform; and
based on the result of the authentication, regulating the following between the host platform and the battery pack: flow of energy, and communication of control and status information via the first SRWT.

15. The method of claim 14, wherein authenticating the host platform further comprises:
receiving, from the host platform via the first SRWT, first information identifying the host platform;
retrieving the following from a credential storage associated with the BMS:
   second information associated with the battery pack, and
   third information identifying the host platform; and
determining an authentication level for the host platform based on the first information, the second information, and the third information.

16. The method of claim 15, wherein determining the authentication level further comprises determining that the host platform is not authenticated if the first information does not correspond to the third information.

17. The method of claim 16, wherein determining the authentication level further comprises, when the first information corresponds to the third information:
determining an association between the host platform and the battery pack, based on the first information and the second information; and
determining whether the host platform is fully authenticated or partially authenticated based on the association.

18. The method of claim 17, wherein the determined association is one of the following:
specific host platform to group of one or more specific battery pack;
specific model of host platform to group of one or more specific battery pack;
specific version of host platform to group of one or more specific battery pack;
specific model of host platform to specific model of battery pack;
specific version of host platform to specific model of battery pack;
specific version of host platform to specific version of battery pack; and
type of host platform to any battery pack.

19. The method of claim 15, further comprising:
retrieving, from the credential storage medium, first information identifying the battery pack; and
sending the first information identifying the battery pack to the host platform via the first SRWT.

20. The method of claim 14, wherein regulating based on the result of the authentication further comprises:
when the host platform is not authenticated, disabling the flow of energy and the communication of control and status information; and
otherwise, enabling the flow of energy and the communication of control and status information according to a determined authentication level.

21. The method of claim 20, wherein:
the first SRWT comprises:
a first transceiver that utilizes a first short-range wireless protocol, by which the host platform authentication is performed; and
a second transceiver that utilizes a second short-range wireless protocol, by which communication of control and status information is performed; and
enabling the communication of control and status information comprises turning on the second transceiver and disabling the communication of control and status information comprises turning off the second transceiver.

22. The method of claim 20, wherein:
the first SRWT comprises a first transceiver that is configured to communicate with the host platform via first and second links;
authenticating the host platform is performed based on communication via the first link; and
enabling the communication of control and status information comprises establishing the second link.

23. The method of claim 20, wherein:
the host platform is a vehicle that is electrically coupled to the battery pack; and
enabling the flow of energy and the communication of control and status information according to a determined authentication level comprises enabling the flow of energy and the communication of all available control and status information when the host platform is at least partially authenticated.

24. The method of claim 20, wherein:
the host platform is a charging station or a diagnostic station that is electrically coupled to the battery pack; and
enabling the flow of energy and the communication of control and status information according to a determined authentication level comprises:
  enabling the flow of energy and the communication of all available control and status information between the host platform and the battery pack when the host platform is fully authenticated; and
  enabling the flow of energy and the communication of a subset of available control and status information between the host platform and the battery pack when the host platform is partially authenticated.

25. The method of claim 24, wherein partially authenticated comprises the following levels:
  a first level in which communication is enabled for all available status information and communication of control information is disabled; and
  a second level in which communication is enabled for only a subset of available status information and communication of control information is disabled.

26. A non-transitory, computer-readable medium storing computer-executable instructions that, when executed by a controller, configure a battery management system (BMS) to perform operations corresponding to the method of claim 14.

* * * * *